(12) United States Patent
Appenzeller et al.

(10) Patent No.: US 7,624,269 B2
(45) Date of Patent: Nov. 24, 2009

(54) SECURE MESSAGING SYSTEM WITH DERIVED KEYS

(75) Inventors: Guido Appenzeller, Menlo Park, CA (US); Xavier Boyen, Palo Alto, CA (US); Terence Spies, San Mateo, CA (US)

(73) Assignee: Voltage Security, Inc., Palo Alto, CA (US)

( * ) Notice: Subject to any disclaimer, the term of this patent is extended or adjusted under 35 U.S.C. 154(b) by 831 days.

(21) Appl. No.: 10/887,721

(22) Filed: Jul. 9, 2004

(65) Prior Publication Data

US 2006/0010324 A1    Jan. 12, 2006

(51) Int. Cl.
*H04L 9/00*    (2006.01)

(52) U.S. Cl. .................. 713/171; 713/150; 713/168; 380/44; 380/277; 380/278; 380/284; 726/2; 726/12

(58) Field of Classification Search ................ 713/150, 713/168, 171, 169, 170; 726/2, 12; 380/44, 380/277, 278, 279, 281, 284
See application file for complete search history.

(56) References Cited

U.S. PATENT DOCUMENTS

| | | | |
|---|---|---|---|
| 6,584,564 B2 | 6/2003 | Olkin et al. | |
| 7,093,121 B2 * | 8/2006 | Barton et al. | 713/150 |
| 2003/0026433 A1 | 2/2003 | Matt | |
| 2003/0208677 A1 * | 11/2003 | Ayyagari et al. | 713/168 |

* cited by examiner

*Primary Examiner*—Kimyen Vu
*Assistant Examiner*—Baotran N To
(74) *Attorney, Agent, or Firm*—Treyz Law Group; G. Victor Treyz; David C. Kellogg

(57) ABSTRACT

Secure messages may be sent between senders and recipients using symmetric message keys. The symmetric message keys may be derived from a master key using a key generator at an organization. A gateway may encrypt outgoing message using the derived keys. Senders in the organization can send messages to recipients who are customers of the organization. The recipients can authenticate to a decryption server in the organization using preestablished credentials. The recipients can be provided with copies of the derived keys for decrypting the encrypted messages. A hierarchical architecture may be used in which a super master key generator at the organization derives master keys for delegated key generators in different units of the organization. An organization may have a policy server that generates non-customer symmetric message keys. The non-customer symmetric message keys may be used to encrypt messages sent by a non-customer sender to a recipient at the organization.

8 Claims, 9 Drawing Sheets

US 7,624,269 B2

SECURE MESSAGING SYSTEM WITH DERIVED KEYS

BACKGROUND OF THE INVENTION

This invention relates to cryptographic systems, and more particularly, to cryptographic systems using derived keys.

It is often desirable to encrypt sensitive electronic communications such as email messages.

With public key cryptographic systems, two types of keys are used—public keys and private keys. Senders may encrypt messages using the public keys of recipients. Each recipient has a private key that is used to decrypt the messages for that recipient.

With symmetric key cryptographic arrangements, the sender of a message uses the same key to encrypt the message that the recipient of the message uses to decrypt the message. An advantage of symmetric key cryptography is that symmetric key encryption and decryption algorithms are computationally efficient.

Often senders and recipients of secure messages have existing relationships with organizations. For example, a bank may wish to send its customers account statements securely. As another example, a customer who receives an encrypted account statement may wish to send a secure email message back to the bank to ask a question.

It is an object of the present invention to provide secure messaging systems that use symmetric keys to facilitate secure communications.

SUMMARY OF THE INVENTION

Secure messages may be sent between senders and recipients using symmetric message keys. An organization may have a key generator that derives symmetric message keys from a master key. The key generator may produce the derived keys by applying a one-way function such as an HMAC function or other hash function to the master key and recipient identity information (i.e., a recipient ID). The resulting derived keys are specific to each recipient. The compromise of a derived key will not compromise the master key, which helps to ensure security.

A sender may use a derived key to encrypt a message for a recipient who is a customer of the organization. Because the recipient is a customer of the organization, there is a preexisting relationship between the recipient and the organization. The organization therefore has recipient credential information that can be used to authenticate the recipient.

When the recipient receives an encrypted message, the recipient can authenticate to the organization and can request a copy of the derived key to use in decrypting the message. The derived key request includes the recipient ID. The recipient ID that is provided with the key request from the recipient may be used by the key generator to derive a new copy of the derived key. This new copy of the derived key may then be provided to the recipient over a secure communications channel. The recipient may use a decryption engine on the recipient's equipment to decrypt the encrypted message with the received copy of the derived key.

A hierarchical key generator architecture may be used for an organization with multiple organizational units. Each unit may have a respective delegated key generator that generates derived symmetric keys for senders in its unit. The organization may have a super key generator that has a super master key. The super key generator may derive sub-master keys for each delegated key generator.

Symmetric key arrangements can also be used to allow senders outside of an organization who are not customers of the organization to send messages to recipient inside the organization. The organization may have a key generator for creating derived keys based on a master key and recipient IDs. A policy server in the organization may use the derived keys and a random number N to generate (derive) non-customer symmetric keys.

For example, the key generator may apply an HMAC function to a master key and recipient ID to produced a derived key. The policy server may generate a random number N and may apply an HMAC function to the derived key from the key generator and the random number N to produce the non-customer message key.

When a sender desires to send a message to a recipient in the organization, the sender and policy server establish a secure link. The policy server provides the sender with the non-customer message key over the secure link. The sender uses the non-customer message key to encrypt a message for the recipient. The sender then sends the encrypted message including the value of N to the recipient. At the recipient, the recipient can use the recipient ID and the value of N to obtain a copy of the non-customer message key from the policy server. The recipient can then decrypt the encrypted message from the sender.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to cryptographic systems such as systems for supporting secure messaging. The invention also relates to methods for using such systems.

Figure 1:
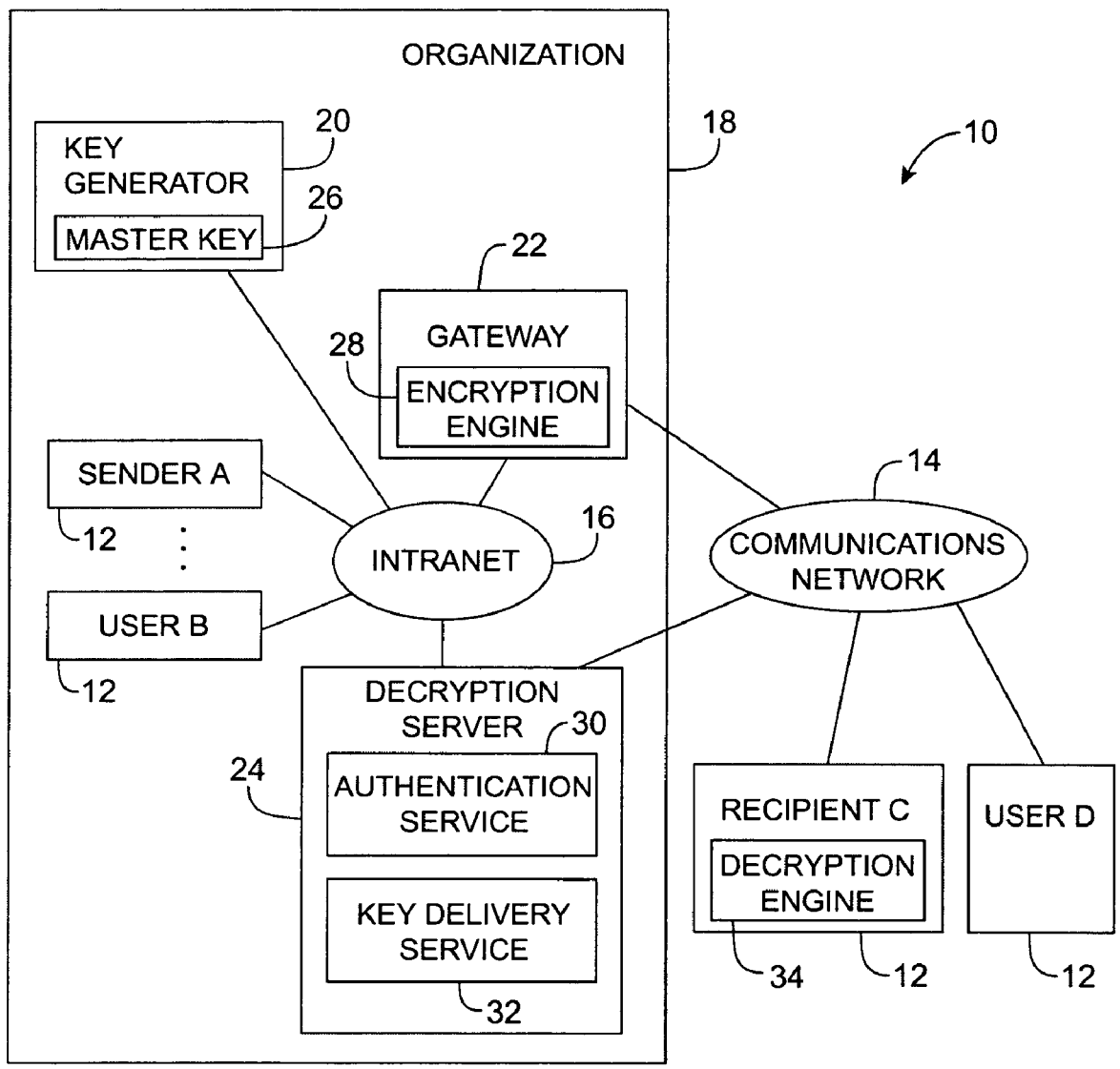
FIG. 1 is a diagram of an illustrative system in which secure messages may be conveyed between senders and recipients in accordance with the present invention.

Equipment of the type shown in system 10 of FIG. 1 may be used to support secure communications between senders and recipients. A sender is a user who sends a message. A recipient is a user who receives a message. Because users can generally both send and receive messages, a given user may at one time be a sender and at another time be a recipient.

Some users in system 10 may belong to an organization such as organization 18. Other users may belong to a different organization or may not be affiliated with any organization.

In the example of FIG. 1, sender A and user B are users who belong to organization A. Recipient C and user D are users who are not affiliated with organization A.

Some user activities in system 10, such as sending person-to-person email messages, involve manual intervention. For example, a person who desires to send a personally-composed text message must type the message before it is encrypted and sent to the appropriate recipient. Other user activities in system 10 may be entirely automated so that no human intervention is generally required. As an example, an organization may use a computer to automatically send messages to each of its customers. In this type of scenario the computer serves as a type of user (i.e., a sender in this example). In the following discussion, the terms "sender," "recipient," and "user" are used to describe both people and their equipment.

The messages that are carried by the system need not be email messages, although email messages are used as an example. The messages may be email messages, instant messages, or any other suitable electronically-conveyed message. Messages may include any digital information (e.g., text, graphics, audio, video, commands, executable code, data, etc.) that it is desired to convey electronically between senders and recipients.

Users in system 10 may communicate with each other using equipment 12. Equipment 12 (and the equipment for the other entities in the system) may, for example, include computing equipment such as a personal computers, portable computers, workstations, mainframe computers, networked computers or terminals such as computer terminals that are connected to the Internet using a host computer in a local area network, handheld computers, cellular phones, or any other suitable electronic equipment.

The equipment of FIG. 1 may be interconnected by communications paths in communications network 14 and intranet 16.

Network 14 may include the Internet and other wide area networks, one or more intranets, local area networks, switched telephone networks, networks such as virtual private networks, networks including dedicated leased lines, networks based on wired or wireless paths, or any other networks formed using any other suitable network technology.

Intranets such as intranet 16 are communications networks that are used to network the users at a particular organization. For example, the intranet 16 of FIG. 1 is associated with an organization 18 and is used to interconnect equipment such as the equipment 12 for sender A and user B, a key generator 20, a gateway 22, and a decryption server 24. Intranets such as intranet 16 may be local area networks or wide area networks. An illustrative intranet for a small company might be, for example, a ten-seat Ethernet network. A large organization might have multiple campuses at widely spaced locations. Such an organization's intranet might be built from Ethernet-based local area networks at each campus linked together by secure paths over the Internet.

System 10 may have a key generator such as key generator 20 for generating keys. Key generator 20 may derive multiple user-specific keys from a master key 26.

Messages may be encrypted using encryption engines and may be decrypted using decryption engines. Any suitable cryptographic algorithm may be used for encryption and decryption of messages in system 10. A symmetric-key cryptographic arrangement is preferred. Suitable symmetric key algorithms include AES (Advanced Encryption Standard), DES (Data Encryption Standard), Triple-DES, etc.

In one suitable arrangement, all messages from senders at organization 18 are routed to network 14 through intranet 16 and gateway 22. The gateway 22 may have an encryption engine 28 for encrypting the messages. After an encrypted message has been received by a recipient, it may be decrypted using a decryption engine such as decryption engine 34 of recipient C.

In symmetric key cryptography, the same key is used for both encryption and decryption operations. A recipient such as recipient C who is outside of the organization 18 may obtain a copy of the key that the encryption engine 28 at gateway 22 used for encryption by making a key request to organization 18. Once the key has been obtained by the recipient, a decryption engine such as decryption engine 34 may be used to decrypt the message and access its contents.

Decryption server 24 may be used to handle requests for keys. An authentication service 30 may be used to authenticate users before they are provided with requested keys. Key delivery service 32 may be used to fulfill the key requests of authenticated requesters.

In one suitable scenario, users have software applications ("client software") such as email applications, email applications with web browser engines (i.e., built-in web browser capabilities), web browser applications, document creation and editing applications, image viewers, media players, etc. The functions of the encryption and decryption engines may be provided using stand-alone encryption and decryption applications or using encryption and decryption software components that are integrated with these applications. As an example, an email program such as an email program used by a recipient may have a decryption engine. The encryption engine may be provided as part of the native code in the email application or may be installed as a plug-in module. As another example, software used to manage a gateway such as gateway 22 may have a built in encryption engine or the encryption engine may be provided as a separate software component.

Various computing devices may be used in system 10. For example, computing equipment may be used to implement the functions of a server or other computer equipment at each key generator 20, gateway 22, and decryption server 24. Servers may also be used to support the functions of a certificate authority, mail servers, and other entities. Such servers may be co-located with a sender or sender's organization, may be connected to the network 14 as an independent third-party service, may be part of the infrastructure of network 14, may be associated with a given recipient's organization, may be co-located with the recipient, key generator, or other equipment, or may used at more than one of these locations. These are merely illustrative arrangements which need not be mutually exclusive.

A server may be formed using a single computer or multiple computers. Multiple servers may be implemented on one computer. If desired, the functions of a single server may be provided by computers that are distributed over a number of different physical locations. The functions implemented using servers in system 10 may generally be performed using other computer equipment configurations if desired, but the computing equipment for implementing these functions is sometimes referred to as a "server" or "servers."

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or other electronic message may be sent.

During operation of system 10, certain entities such as decryption server 24 may need to verify that a given party has permission to obtain a key, to download new client software (including, e.g., a decryption algorithm), to access the contents of a particular message, or to perform other functions. In general, the entity performing such authentication and authorization processes may use any suitable manual or automatic techniques. For example, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. Hardware-based arrangements (e.g., based on hardware tokens) may be used to establish identity. A user may provide credentials in the form of a pre-established user name and password. Certificate authorities may create digital certificates that help to verify the identities of certain parties. Digital signatures (e.g., signatures from a certificate authority or other entity that use private keys and that can be verified using matching public keys) may be used to ensure that a message or other signed information is associated with a particular party. Sometimes an authentication process in system 10 may involve the generation of a ticket such as a Kerberos ticket or other proof of authorization. User authentication operations are generally described herein without need to distinguish between information such as ticket information that is derived from or based on recipient credential information and the underlying username and password or other recipient credential information that is entered by a user.

Sometimes authentication information and other information must be conveyed between parties securely (e.g., between decryption server 24 and a user). A number of different approaches may be used to convey information in system 10 securely. For example, information may be conveyed securely over a secure communications path such as a communications path that uses the secure sockets layer protocol (SSL) or other suitable secure protocol (e.g., TLS), a communications path may be trusted because it is under the control of a trusted party (e.g., because the communications path is entirely within organization 18 and is therefore physically under the control of a trusted party), and information may be conveyed securely by encrypting the information (e.g., in a message) before sending it over an insecure (or secure) link.

For ease of interfacing with existing encryption mechanisms or for other suitable reasons, it may sometimes be desired to use a "two-step" encryption technique in which a first key is used to encrypt the contents of a message and a second key is used to encrypt the first key. During decryption, the second key is used to decrypt the encrypted version of the first key, which may then be used to unlock the message contents. These two-step processes (and analogous higher-order multi-step processes) may be more efficient than "pure" or "single step" encryption algorithms and may be used if desired. For clarity, the present invention is described in the context of single-step algorithms.

Public key cryptography is often used in secure messaging systems. With public key cryptography, a sender may encrypt a message for a recipient using that recipient's public key. The recipient uses a matching private key for decryption. Although public key cryptography is generally satisfactory, it can be unnecessarily cumbersome in environments in which there is already a preexisting relationship between sender and recipient.

Consider the illustrative scenario in which organization 18 is a bank. The bank has an existing set of customers to whom it is desired to securely distribute electronic account statements. The bank and customers already have a trusted relationship with each other. For example, the bank has already assigned account names and numbers to its customers. When the customers opened their accounts, the bank collected personal information such as social security number information, telephone numbers, the names of relatives, birth dates, birth places, email addresses, etc. This information can be used by the bank to verify customers' identities. The bank's customers may also have personal-identification numbers (PINs) for withdrawing cash from automatic teller machines and usernames and passwords for authentication prior to performing on-line banking tasks.

In this type of environment, the bank and its customers are not strangers. It is therefore unnecessary for the bank and its customers to rely exclusively on a cryptographic approach such as public-key cryptography that is designed to allow senders and recipients to treat each other as strangers.

The present invention can leverage the preexisting relationship between the bank and its customers. Efficient symmetric key encryption can be used rather than public-key encryption. The preexisting relationship between the bank and its customers can also be used to facilitate operations such as authentication and key distribution.

In the following discussion, organization 18 may be a company or corporation or any other suitable type of enterprise. The users at the organization may be employees, volunteers, contractors, or any other suitable types of members of the organization (or their equipment). Users in the organization are distinguished from users outside of the organization by their access to intranet 16 and the equipment that is networked together inside of the organization using intranet 16 such as gateway 22.

Some of the users outside of the organization may be independent third parties who have no relationship with the organization.

Other users outside of the organization may be the customers of the organization. For example, account holders at a bank are customers of the bank, as discussed above. Customers may be clients, contractors, temporary employees without the same access rights as employees working at the organization, or any other suitable users who are associated with the organization as customers but who are not part of the organization itself.

Once a user has become associated with a given organization as a customer, the relationship between the user and the organization can be leveraged to support the secure communications techniques of the present invention. In a typical scenario, a sender A such as an automated account statement distribution server at a bank 18 sends encrypted account statement messages to recipients who are customers such as recipient C. The sender A sends each message through gateway 22. Gateway 22 uses encryption engine 28 to encrypt each message using a symmetric key. The symmetric key is derived from the master key 26 by the key generator 20 and is therefore referred to as a "derived key." Many different keys can be derived in this way, so derived keys may be produced that are unique for each recipient. By using a deterministic key derivation mechanism, derived keys need not be stored by the key generator, since any user's key can easily be re-derived as needed from the user ID.

After the gateway has encrypted the message for recipient C using recipient C's derived symmetric key, the gateway may relay the encrypted message to recipient C. The encrypted message may be delivered to recipient C over communications network 14. Upon receiving the encrypted message, recipient C may obtain a copy of the derived key from the organization A, so that recipient C may use decryption engine 34 to decrypt the message's contents.

Recipient C can obtain recipient C's derived key by sending a key request to decryption server 24. Because recipient C is a customer of the bank, the authentication service 30 may use preexisting recipient credentials such as recipient C's account name and PIN to authenticate recipient C. Once authentication service 30 has verified the identity of recipient C and determined that recipient C is authorized to obtain a copy of the derived key, the derived key for recipient C may be delivered to recipient C using key delivery service 32.

Figure 2:
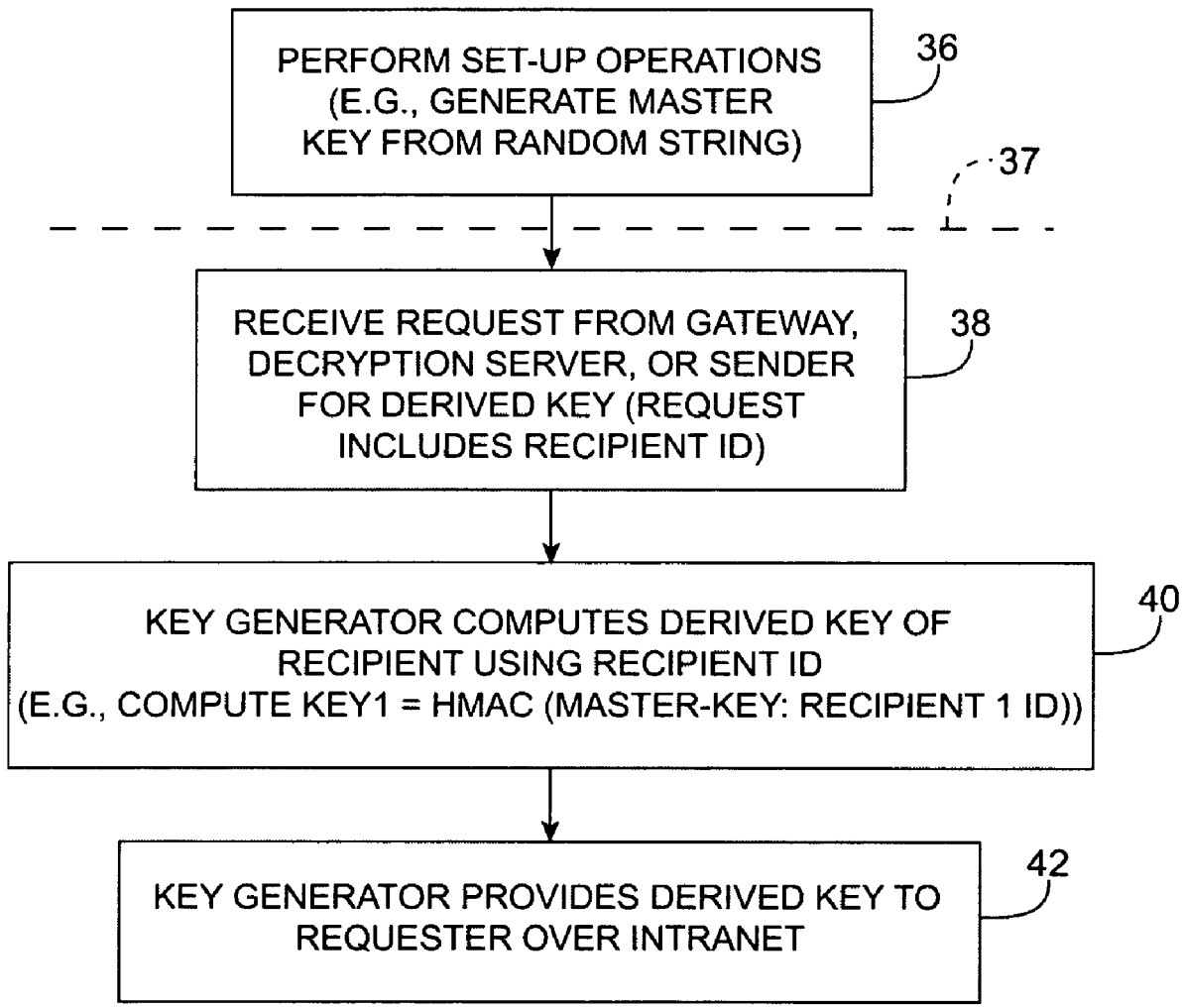
FIG. 2 is a flow chart of illustrative steps involved in setting up a system of the type shown in FIG. 1 and satisfying derived key requests in accordance with the present invention.

Illustrative steps involved in setting up system 10 and in responding to derived key requests are shown in FIG. 2.

Set-up operations are performed at step 36. During setup, master key 26 may be generated by the key generator 20. Master key 26 may be generated, for example, from a random string with sufficient entropy (i.e., as many bits of entropy as the size of the master key). The random string may contain any suitable symbols. In general, there is an equivalency between numbers, letters, and other symbols, and other such schemes for representing information. Because of the inherent equivalency between these different representational schemes, the techniques involved in converting letters or symbols into numbers or for representing multiple numbers or strings as a single number or other such operations are not described in detail herein. The key generator is preferably implemented on a secure server so that the master secret cannot be compromised.

After setup operations such as the generation of the master key 26 have been performed, the key generator 20 can respond to requests for derived keys from other equipment at organization 18. Derived keys are keys that are derived from the master key 26 for a specific purpose (e.g., to correspond to a particular recipient). If one or any number of derived keys is compromised, the security of other operations that rely on other derived keys is not also compromised. Moreover, the master key cannot feasibly be deduced from any collection of derived keys, which protects the master key.

The process of responding to a derived key request involves steps 38, 40, and 42. These steps are typically performed at a different time than the set-up operations of step 36, as indicated by dotted line 37. Entities at organization 18 that can generate requests for derived keys may include gateway 22, decryption server 24, and users 12. Users who request derived keys directly from key generator 20 may perform encryption using an encryption engine in their client software, without using a encryption engine on the gateway such as encryption engine 28. The use of gateways such as gateway 22 is therefore optional, and may be dictated by organization policies. In systems with gateways, the gateway can request derived keys to use in encryption engine 28. Decryption server 24 may request keys on behalf of users outside the organization. Key requests may be provided to key generator 20 over intranet 16.

At step 38, key generator 20 receives the derived key request from a trusted entity within the organization such as a gateway 22, decryption server 24, or a user in the organization such as sender A. Derived key requests are preferably only accepted from these trusted entities. Because the derived key is specific to a particular user (e.g., a customer), the derived key request preferably includes a user identifier (user ID). For example, when a derived key is being requested to encrypt a message for a recipient, the request for that key should include information on the identity of the recipient (i.e., a recipient ID).

At step 40, the key generator 20 computes the derived key that has been requested. The derived key that has been requested is unique to the recipient ID that was provided in the request. If desired, the derived key may be made unique in other respects or may not include recipient ID information. For example, the derived key may be made unique to a particular date or date range, to enhance security. Each message may be required to have its own associated derived key, so that derived keys will be unique to both recipients and messages, although this greatly increases the burden on the key generator. Derived keys may be produced based on email addresses (a type of user ID) or on domain name information. For clarity, the present discussion focuses primarily on arrangements in which derived keys are derived from the master key based on user IDs. This is, however, merely illustrative. Any suitable inputs may be used by the key generator 20 when deriving the derived keys.

Any suitable one-way function may be used by the key generator 20 to produce a derived key from the master key and the recipient ID. As an example, the key generator 20 may compute the derived key for recipient A (dkeyA) using a hash function such as the hash function of equation 1.

$$dkeyA=HMAC(\text{master-key:recipient\_ID}) \tag{1}$$

In equation 1, master-key is the master key 26 and recipient_ID is information on the identity of the recipient. The value dKeyA is the derived symmetric key. The function HMAC is the well-known keyed-hash message authentication code function. In the notation used for equation 1 and the other equations herein, the argument of the function that appears before the colon is key information used by the cryptographic function (here an HMAC function). The argument(s) after the colon represent non-key information—in this case a recipient ID.

Using the function of equation 1, the key generator 20 can compute the keyed-hash value of the recipient's identity. The key derivation function of equation 1 is, however, merely illustrative. Any suitable one-way function that can operate on the master key and recipient ID to preserve the secrecy of the master key while making the derived key unique to the recipient ID may be used. Suitable one-way functions will be deterministic so that senders' and recipients' copies of the derived keys will match, without requiring the key generator to store any information specific to the individual derived keys. Suitable one-way functions will also be collision resistant so that a request for user X will not accidentally or adversarially produce a derived key for user Y (as an example). Suitable one-way functions include hash functions, keyed hash functions, digital signature functions, etc.

After producing the derived key in response to the derived key request, the key generator 20 may provide the derived key to the requester at step 42. The key generator 40 may, for example, send the derived key to gateway 22, a sender in the organization 18, or decryption server 24 over the intranet 16 of the organization. Intranet 16 is controlled by the organization 18 and may therefore be assumed to be secure.

The derived key can be stored locally by the gateway 22, sender in organization 18, or decryption server 24 (e.g., until a time-stamped derived key expires). Storing the derived key in a local cache in this way may reduce the number of derived key requests that are handled by key generator 20. When local storage is used, the requester of a derived key can check the local storage for a copy of the derived key when the key is needed. If a current version of the derived key is available in the local storage, the key request to the key generator 20 need not be made.

Figure 3:
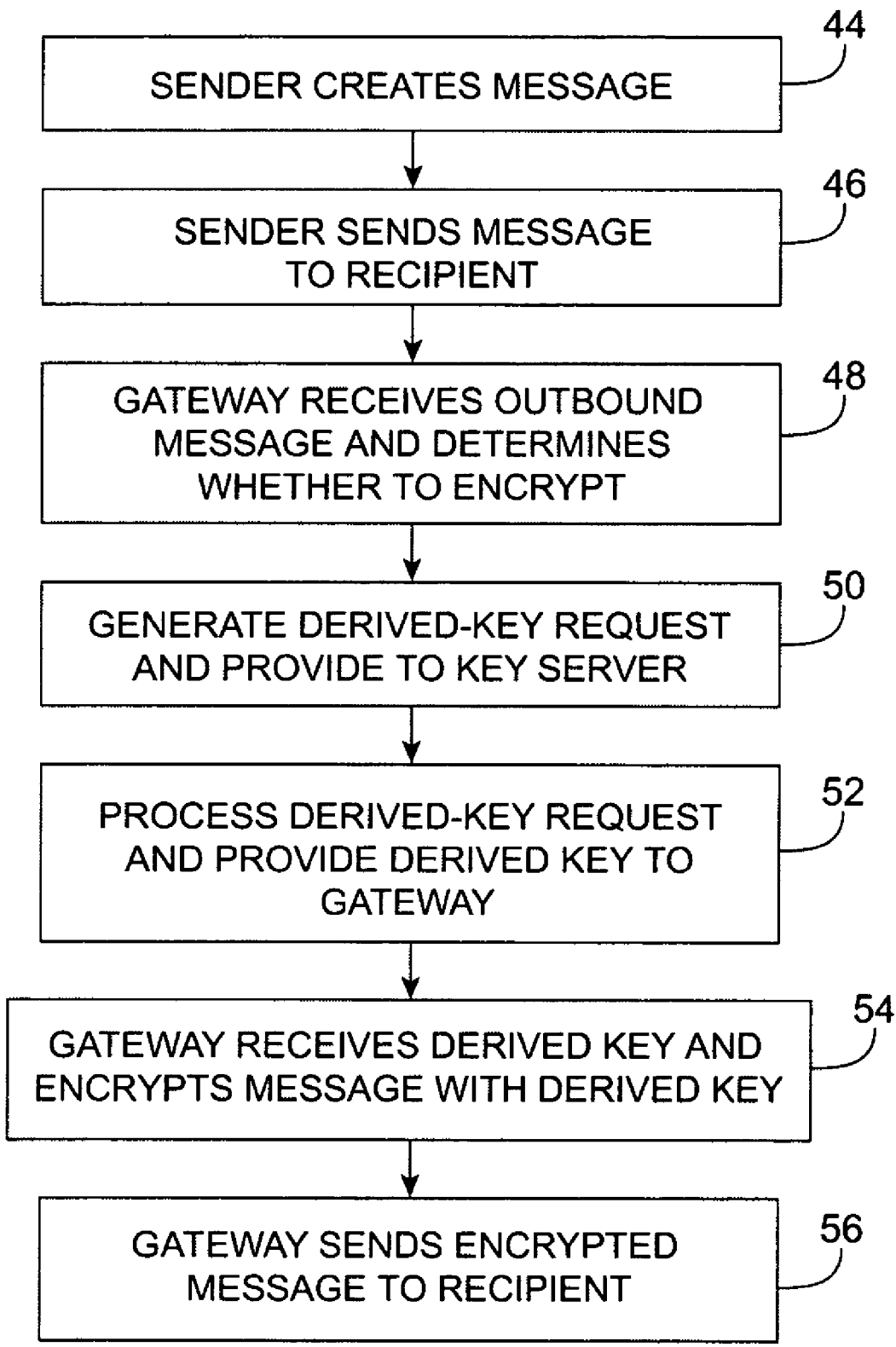
FIG. 3 is a flow chart of illustrative steps involved in encrypting and sending secure messages using a system of the type shown in FIG. 1 in accordance with the present invention.

Illustrative steps involved in encrypting and sending a message from within organization 18 to an outside recipient who is a customer of the organization 18 are shown in FIG. 3.

At step 44, a sender at the organization 18 such as sender A creates a message that is to be sent securely to a recipient such as recipient C who is a customer of the organization 18. The sender's client software may create the message content or the message content may be obtained by sender A from another suitable source.

At step 46, sender A sends the message to the recipient. As an example, sender A's email client may send an email message that is addressed to the recipient over intranet 16. The message generally need not be encrypted at this point, because intranet 16 is assumed to be secure.

The outbound message from the sender may be received by the gateway 22 at step 48. The gateway may have message management software or other suitable software that is used to implement policies such as encryption policies, virus scanning policies, archiving policies, etc. The gateway can use these policies and message attribute information such as message content information, source and destination address information, header information, etc. to determine how to handle each message. For example, the gateway can examine the domain name portion of each recipient's email address to determine whether or not a particular message should be encrypted.

Any suitable encryption policies may be implemented using gateway 22. For example, gateway 22 may encrypt all outgoing messages, may encrypt messages being sent to a particular recipient or list of recipients (i.e., particular customers), may encrypt messages to those recipients whose email addresses contain a predetermined domain name, may encrypt messages to recipients based on their status or date of association with the organization, etc.

If the gateway 22 determines that the message should be encrypted, the gateway 22 may obtain a suitable derived key for the decryption process from key generator 20. If the appropriate derived key is available locally, the gateway 22 may use the locally-stored version of the derived key. If the derived key is not available locally, the gateway generates a derived key request and provides the derived key request to the key generator 20 over intranet 16 at step 50. The derived key request includes the identity of the recipient. Any suitable format may be used to provide recipient identity information to the key generator in the derived key request. For example, the recipient identity information may be provided in the form of a recipient ID (e.g., recipient C's email address or information based on recipient C's email address).

At step 52, the key generator 20 receives and processes the derived key request. The derived key may be generated using the process of steps 38, 40, and 42 of FIG. 2. After the derived key has been generated, the derived key may be provided to the gateway 22 over intranet 16.

At step 54, the gateway 22 receives the derived key from the key generator 20. The gateway may then use the encryption engine 28 to encrypt the message contents to produce ciphertext. Encryption engine 28 may be a symmetric key encryption engine that uses a symmetric key encryption algorithm such as AES or may use any other suitable encryption algorithm. The inputs to the encryption engine 28 include the derived key of the recipient and the unencrypted message contents. The output of the encryption engine 28 includes the encrypted version of the message (ciphertext).

At step 56, the gateway 22 may relay the encrypted version of the message to recipient C. The encrypted message may pass through one or more mail servers (including mail servers inside and outside of organization 18) before being received by recipient C.

Figure 4:
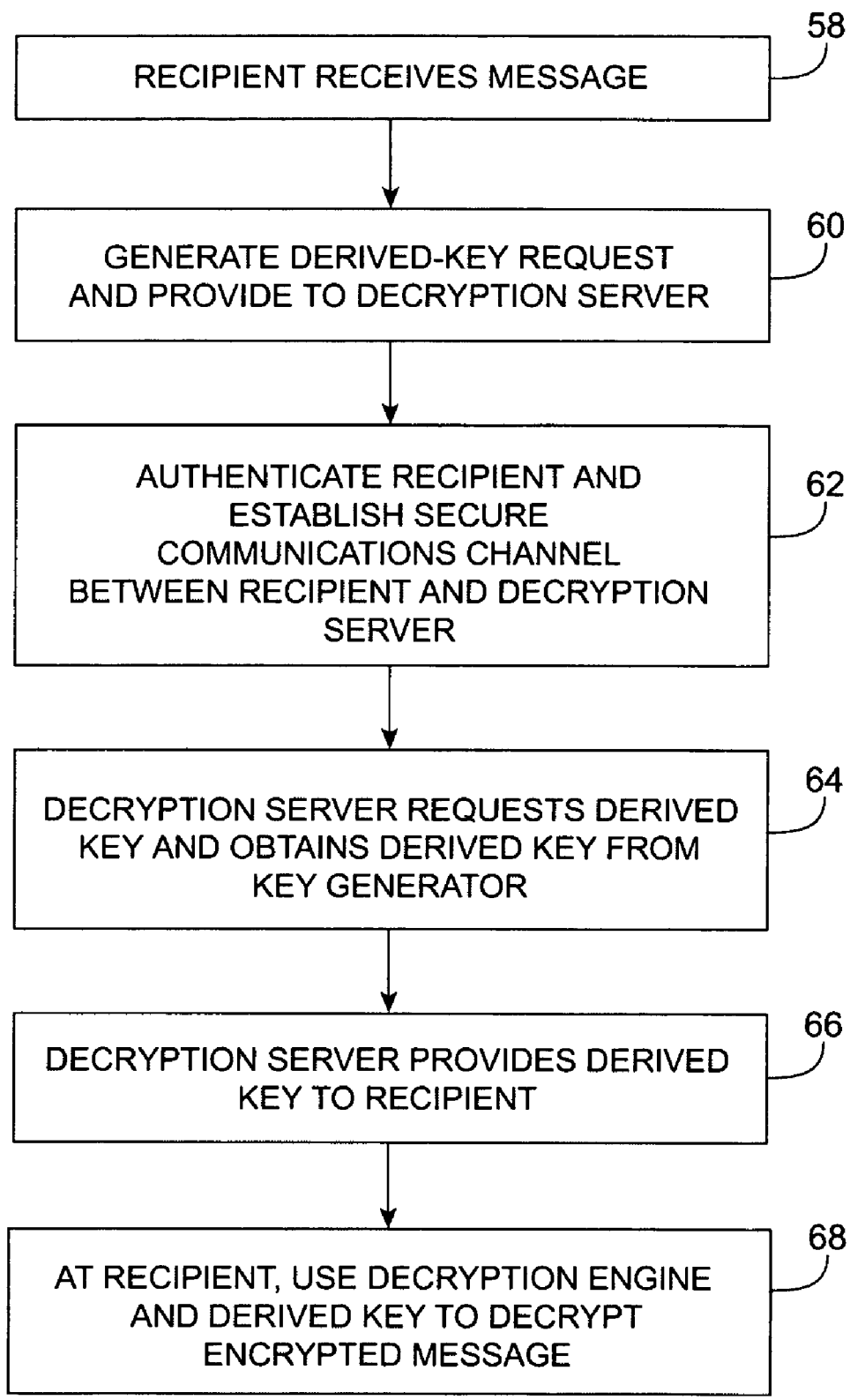
FIG. 4 is a flow chart of illustrative steps involved in receiving and decrypting secure messages using a system of the type shown in FIG. 1 in accordance with the present invention.

Illustrative steps involved in receiving and decrypting the encrypted message are shown in FIG. 4.

At step 58, the recipient (recipient C in this example) receives the message over communications network 14. The message may be received by the recipient's client software running on the recipient's equipment 12.

If the recipient's client software has a copy of an appropriate derived key available in a local cache, the client software may use that derived key to decrypt the message. If the derived key is not available locally, the recipient may obtain a copy of the derived key from organization 18.

In particular, at step 60, the recipient may generate a derived-key request and may provide the derived key request to the decryption server 24. Any suitable arrangement may be used to make the derived key request. For example, the client of sender A or the gateway 22 may automatically include a clickable link (e.g., a web link) in the outgoing message. When recipient C receives the message, instructions in the message may prompt recipient C to click on the link. Clicking on the link may instruct recipient C's web browser or other suitable client software to transmit certain information in the link to a particular web address over communications network 14. The information that is transmitted may include recipient identity information and may serve as a derived key request. The web address may be associated with decryption server 24. This is merely one illustrative way in which a derived key request may be provided to decryption server 24. Any suitable arrangement may be used if desired.

At step 62, the decryption server 24 may process the derived key request by authenticating the recipient and establishing a secure communications channel between server 24 and the equipment of recipient C. Any suitable authentication technique may be used if desired. For example, the recipient's client may provide recipient credentials to the decryption server in the form of username and password information. The username and password information might be, for example, bank account name information and PIN information if organization 18 is a bank. During the authentication process, the decryption server uses authentication service 30 to verify the recipient's credentials. If the recipient's credentials match credential information maintained at the organization (and are consistent with the recipient ID in the derived key request), the decryption server 24 can conclude that the recipient who is requesting the derived key is authorized to obtain a copy of that recipient's derived key. During the authentication process, the server 24 and recipient C's equipment 12 establish a secure communications channel (e.g., an SSL link). This secure communications channel can be used for derived key delivery.

At step 64, after the decryption server 24 has determined that the requesting recipient (recipient C in this example) is authorized to obtain a copy of the derived key, the decryption server 24 may request and obtain the derived key from key generator 20. The key request made by decryption server 24 may be made over intranet 16 and may include the recipient ID. The decryption server 24 is at the same organization as the key generator 20, so the key generator 20 trusts the decryption server. Accordingly, the key generator 20 may use the recipient ID information from the decryption server and the derived key generation process of steps 38, 40, and 42 (FIG. 2) to produce the derived key. The derived key may be provided to the decryption server over intranet 16.

After the decryption server 24 obtains the derived key for recipient C from key generator 20 at step 64, the decryption server 24 may provide the derived key to recipient C over communications network 14 at step 66. The decryption server 24 may provide the derived key to recipient C securely by using the secure communications channel that was established at step 62 (e.g., over the SSL link).

At step 68, recipient C receives the derived symmetric key from the decryption server 24 over the secure communications channel. The recipient may then use decryption engine 34 to decrypt the encrypted message (i.e., to decrypt the ciphertext). The inputs to decryption engine 34 are the encrypted version of the message (i.e., the ciphertext) and the derived key of recipient C. The output of the decryption engine 34 is the unencrypted version of the message contents.

The decryption engine 24 uses the same type of cryptographic algorithm that was used by encryption engine 28 (e.g., a symmetric key decryption algorithm using AES, etc.). With this type of symmetric key arrangement, the derived key that is used by the recipient to decrypt the message is the same as the derived key that was used by the sender to encrypt the message (using encryption engine 28 at gateway 22). The decryption engine 34 may be part of a stand-alone software package or may be incorporated into existing client software (e.g., as a plug-in to an email client, etc.).

If desired, the recipient can ask the organization 18 to decrypt the encrypted message instead of asking for a copy of the derived key. In this type of arrangement, the decryption server may include a decryption engine such as decryption engine 34. Rather than making a derived key request to the decryption server 24, the recipient may make a decryption request to decryption server 24. The decryption request can include the recipient's ID. The encrypted version of the message may be provided to the decryption server 24 with the decryption request or using any other suitable arrangement. Following successful authentication of the recipient, decryption server 24 may obtain the derived key from the key generator 20 and may use the local decryption engine to decrypt the contents of the message. The decrypted message contents may be provided to the recipient over a secure link such as an SSL link established during the authentication process.

In large organizations, it may be useful to use a hierarchical arrangement to limit the extent to which various components of the organization must trust each other. For example, an organization may have a North American unit and a European unit. The employees of the North American unit may be associated with one key generator within the organization. The employees of the European unit may be associated with another key generator within the organization. Because this type of arrangement allows parallel and separate security arrangements to be maintained within the same organization, it enhances security. For example, even if the master key of one key generator is compromised, the communications that are secured by the other key generator will remain secure.

A hierarchical security arrangement may also make it easier to deploy intranets 16 within the organization. For example, all entities connected to a local Ethernet at one location may trust one another and all entities connected to a local Ethernet at another location may trust one another. Each Ethernet network may form a local intranet for its associated location, but with a hierarchical security arrangement, it is not necessary to network the two locations together with the same level of trust and security, as each local intranet may be provided with its own delegated key generator (as an example).

The derived key mechanism described in connection with FIG. 2 may be used to derive master keys for each delegated key generator. A super master key may be used to derive these master keys. Because each of the derived master keys is associated with a smaller portion of the organization, they may be referred to as sub-master keys. The delegated key generators may be placed under the control of separate business units within organization or other distinct units (e.g., units divided by geographic region, by management level or other status, by organizational lines, by employee function, etc.).

Once each organizational unit has its own delegated key generator, that delegated key generator may be used to generate derived keys for its associated customers. For example, the North American unit at an organization can use the North American unit's key generator to derive keys for the customers of the North American unit. The European unit's key generator may be used to derive keys for the customers of the European unit. The customers in this type of scenario will be fairly distinct, although they will not necessarily be mutually exclusive (i.e., a customer might be a customer of both the North American unit and the European unit, in which case the customer interacts with each unit using the respective derived key).

In a hierarchical key generator architecture, a super key generator has a super master key (sometimes called a master key) and each delegated key generator has a derived master key (sometimes called a master key or sub-master key). By using a single super master key, a single gateway such as gateway 22 may be used to perform all outgoing encryptions.

Figure 5:
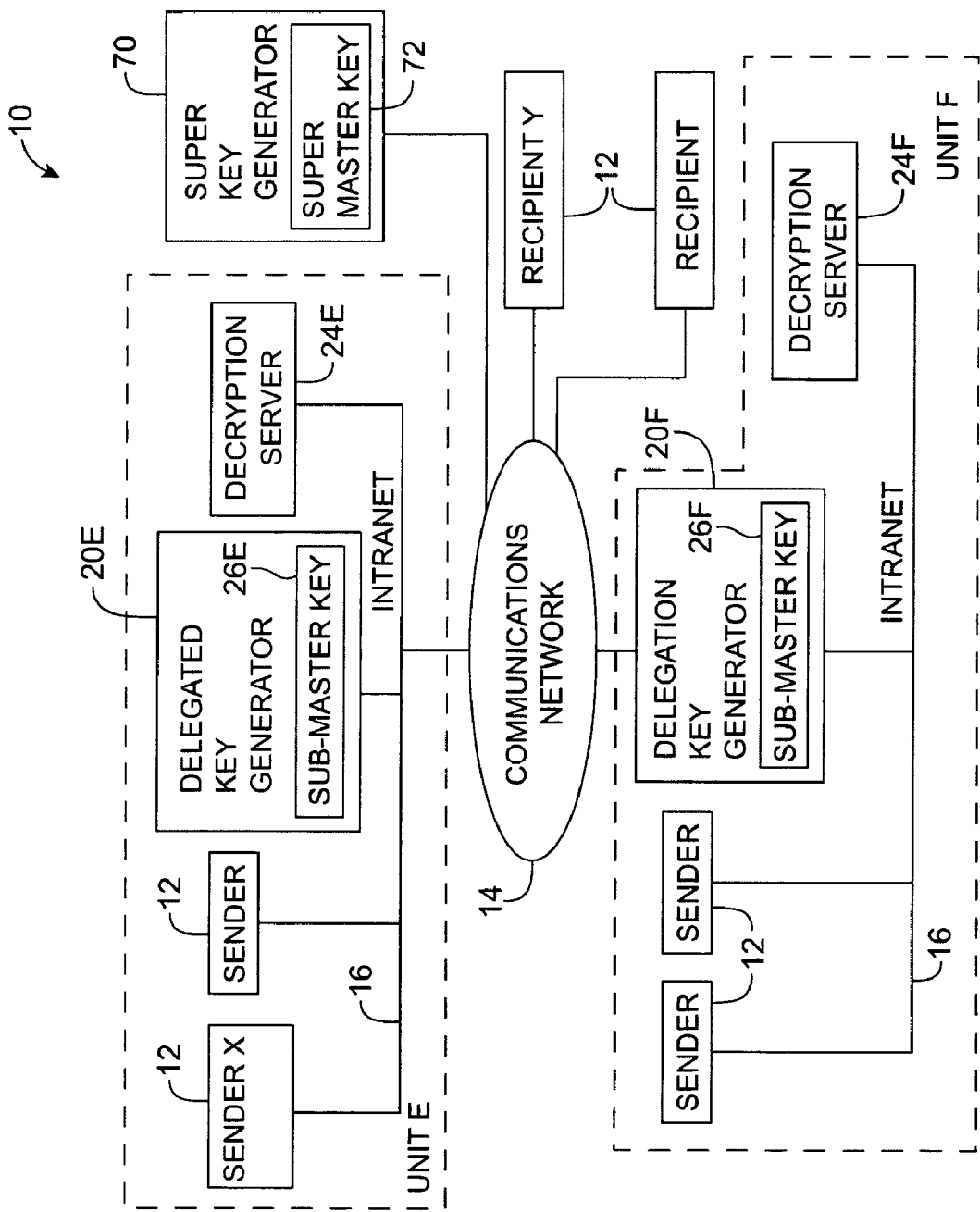
FIG. 5 is a diagram of an illustrative hierarchical arrangement that allows a key generator to create master keys (sub-master keys) for associated key generators in accordance with the present invention.

A diagram of an illustrative system 10 in which a hierarchical architecture has been used for the key generators is shown in FIG. 5. Super key generator 70 has a master key 72. Super key generator 70 is operated by an organization 18 (FIG. 1) and may be used to derive sub-master keys for the various units of the organization. In FIG. 5, two organizational units are shown—unit E and unit F. In general, an organization may have any suitable number of units.

With one suitable arrangement, the organization's units are interconnected with the super key generator 70 through communications network 14, which may be an intranet or other suitable network. This type of arrangement allows the super key generator 70 to distribute derived master keys to the units electronically. If desired, derived master keys may also be distributed manually (e.g., on disks or other media).

The organization controls the super key generator 70 and ensures the secrecy of the super master key 72. Each unit has its own delegated key generator, each of which has its own sub-master key that has been derived from the super master key. In the example of FIG. 5, unit E has a delegated key generator 20E. Delegated key generator 20E uses a sub-master key 26E to generate derived keys for the senders and customers of unit E. Sub-master key 26E was derived from super master key 72 by super key generator 72 during system setup operations. Unit F has a delegated key generator 20F. Delegated key generator 20F uses a sub-master key 26F to generate derived keys. Sub-master key 26F was derived from super master key 72.

Hierarchical key generator arrangements may have any suitable number of layers. For example, additional sub-layers of key generators each with an additional layer of derived master keys could be provided for sub-units of unit E. For clarity, the present invention will be described in connection with a two-layer arrangement in which a single super key generator of the organization generates derived sub-master keys for various units in the organization.

Hierarchical key generator architectures may be used in various system configurations. For example, system 10 may have a central gateway (such as gateway 22 of FIG. 1). The central gateway may operate as a clearinghouse for all outbound messages and may have an encryption engine (such as encryption engine 28 of FIG. 1) for encrypting messages. The encryption engine in the central gateway may encrypt messages using the derived keys of various recipients. The derived keys may be provided to the central gateway by the delegated key generators.

In the illustrative arrangement shown in FIG. 5, no gateway is used. Rather, each sender uses client software with an encryption engine to encrypt outgoing messages.

In a typical scenario, a user in a particular unit of the organization desires to send an encrypted message to a customer of that unit. For example, sender X of unit E may desire to send an encrypted message to recipient Y, who is a customer of unit E. Sender X obtains a derived key for encrypting recipient Y's message from delegated key generator 20E. The encrypted message is sent to recipient Y over communications network 14. Recipient Y generates a derived key request. The derived key request is processed by the organization and the requested derived key is provided to recipient Y to decrypt the message.

One or more decryption servers may be used in a system 10 that is based on a hierarchical key generator architecture.

In one suitable arrangement, a central decryption server is used to handle derived key requests from recipients. Each recipient's derived key request includes information identifying the recipient. Each recipient's derived key request may also include information identifying which unit's key generator was used to produce the derived key that the sender used in encrypting the message. The central decryption server can process this information to determine which delegated key generator created the derived key. The central decryption server can then route the key request to the delegated key generator in the appropriate unit of the organization.

If desired, a decryption server may be provided in each unit. This type of arrangement is shown in FIG. 5. Decryption server 24E in unit E is used to obtain derived keys from delegated key generator 20E. The derived keys from delegated key generator 20E are provided to the customers of unit E for decrypting messages from senders in unit E. Decryption server 24F in unit F is used to obtain derived keys from delegated key generator 20F. The derived keys from delegated key generator 20F are used by the customers of unit F to decrypt messages from senders of unit F.

Figure 6:
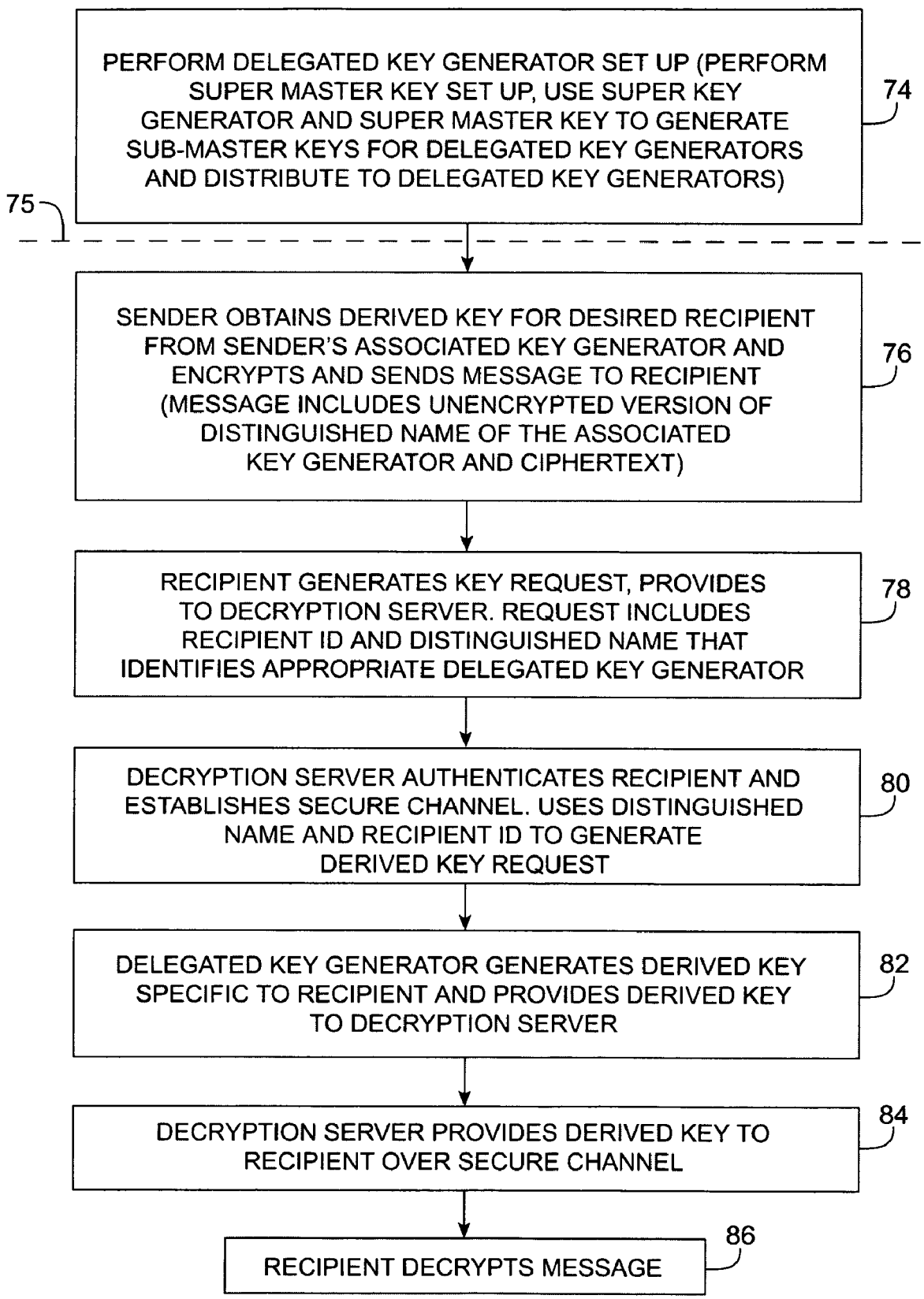
FIG. 6 is a flow chart of illustrative steps involved in setting up and using a system of the type shown in FIG. 5 to send and receive secure messages in accordance with the present invention.

Illustrative steps involved in using a system with a hierarchical key generator arrangement such as system 10 of FIG. 5 to support secure messaging between senders and recipients are shown in FIG. 6.

At step 74, set-up operations are performed. The organization of which unit E and unit F are a part uses super key generator 70 to produce derived master keys for various delegated key generators. The super key generator 70 may derive sub-master key 26E from super master key 72 using equation 2a.

$$\text{sub-master\_key\_E} = \text{HMAC}(\text{super\_master\_key:unitE}) \tag{2a}$$

In equation 2a, sub-master_key_E is the value of sub-master key 26E of FIG. 5. Super_master_key is the value of the super master key 72 that is maintained by super key generator 70. UnitE is the name of the key generator 20E. As described in connection with FIG. 2, any suitable one-way key derivation function may be used to produce the derived master keys for the delegated key generators such as key generator 20E. In the example of equation 2a, the HMAC function is used.

The sub-master key derivation process is repeated for all units in the organization. For example, the super key generator 70 may derive sub-master key 26F of FIG. 5 from super master key 72 using equation 2b.

$$\text{sub-master\_key\_F} = \text{HMAC}(\text{super\_master\_key:unitF}) \tag{2b}$$

The master keys sub-master_key_E and sub-master_key_F may be distributed securely and stored locally by the respective delegated key generators 20E and 20F, as shown in FIG. 5. The super key generator 70 may be networked with the delegated key generators 26E and 26F through a secure intranet that allows keys to be distributed over trusted paths within the organization or keys may be distributed securely though any other suitable communications network 14.

After the delegated key generators have been set up by deriving their sub-master keys using equations 2a and 2b or other suitable key derivation functions, messages may be sent securely at steps 76, 78, 80, 82, 84, and 86. Steps 76, 78, 80, 82, 84, and 86 may be performed at a different time than the set-up operations of step 74, as indicated by dotted line 75.

At step 76, a sender such as sender X in unit E obtains a derived key for a desired recipient such as recipient Y, who is a customer of unit E. The sender's client software may obtain the appropriate derived key to use in message encryption by making a derived key request to delegated key generator 20E over the intranet 16 in unit E. The key request made by the sender includes information on the intended recipient of the message.

In this example, the intended recipient is recipient Y, so the key request may include information identifying recipient Y such as a recipient ID for recipient Y (e.g., recipient_Y_ID). The delegated key generator can then compute a locally derived key using equation 3 or any other suitable key derivation function, as described in connection with FIG. 2.

$$\text{key\_Y} = \text{HMAC}(\text{sub-master\_key\_E:recipient\_Y\_ID}) \tag{3}$$

In equation 3, sub-master_key_E is the master key used by the delegated key generator 20E in generating derived keys for the users of unit E and their associated customers. Recipient_Y_ID is information identifying the intended recipient of the message. Key_Y is the derived key. After Key_Y has been computed, the delegated key generator 20E provides Key_Y to the requesting sender. The client software at the requesting sender includes an encryption engine such as encryption engine 28 of FIG. 1 that uses Key_Y to encrypt the message for the recipient. The client software then sends the encrypted message to the recipient.

The encrypted message includes the encrypted content of the message (ciphertext) and unencrypted information that identifies the appropriate unit for the recipient to contact (i.e., unit E containing delegated key generator 20E and decryption server 24E in this example) when the recipient requests a copy of the derived key (Key_Y) for decrypting the message. The information identifying the delegated key generator and its unit may be provided with the message using any suitable arrangement. For example, the client software at sender X may automatically embed a web link in the outgoing message that contains recipient_Y_ID and a unique name for the delegated key generator 20E and/or decryption server 24E. The web link may also include web address information (e.g., a domain name) associated with decryption server 24E that the recipient can use in contacting the decryption server 24E with a key request. The recipient can click on this web link to initiate a key request to decryption server 24E using the recipient's web browser.

At step 78, after recipient Y receives the encrypted message from sender X over network 14, recipient Y generates a derived key request and provides this request to the decryption server 24E. The key request includes information identifying the recipient (e.g., recipient_Y_ID). The request may also include information that helps the decryption server route the derived key request to the appropriate delegated master key server. For example, the request may include the name of the appropriate delegated master key server that was sent to the recipient with the message.

In environments in which there is a central decryption server, the information on the name of the appropriate delegated key generator may be used to determine which delegated key generator to contact for a copy of the requested derived key. In arrangements of the type shown in FIG. 5 in which there is a one-to-one correspondence between delegated key generators and decryption servers, the recipient may use information in the embedded web link to send the derived key request to a particular one of the decryption servers. This serves to implicitly define the delegated key generator associated with the request.

At step 80, the decryption server 20E authenticates recipient Y and establishes a secure channel between decryption server 20E and recipient Y (e.g., an SSL link). Once recipient Y's authorization to obtain a copy of Key_Y has been verified, the decryption server 20E may use the information in the request that identifies delegated key generator 20E to generate a key request for Key_Y. The key request includes recipient_Y_ID, so that the delegated key generator 20E can use equation 3 to generate Key_Y.

At step 82, the delegated key generator 20E receives the key request from decryption server 24E. Key generator 20E and decryption server 24E operate in the same unit over the same intranet 16, so decryption server 24E is trusted by delegated key generator 20E. The delegated key generator 20E therefore generates the derived key for recipient Y. In particular, delegated key generator 20E may use the information from the request on the recipient's identity (recipient_Y_ID) and the sub-master key 26E in equation 3 to derive Key_Y. The delegated key generator 20E may then provide Key_Y to the decryption server 24E securely over the intranet 16 in unit E.

At step 84, the decryption server provides Key_Y to recipient Y over the secure communications channel between decryption serer 24E and recipient Y.

At step 86, recipient Y uses a decryption engine such as decryption engine 34 of FIG. 1 and Key_Y to decrypt the ciphertext and thereby access an unencrypted version of the message contents.

If desired, each unit may have a gateway for encrypting outgoing messages from the senders in that unit. The delegated key generator in each unit may produce the necessary derived keys for encryption.

In arrangements in which a global gateway is used to encrypt outgoing messages from senders in multiple units, the super key generator 70 may generate the derived keys using equations 4a and 4b.

$$\text{Unit\_j\_key} = \text{HMAC}(\text{super\_master\_key:unit\_j}) \quad (4a)$$

$$\text{Key}_{j,k} = \text{HMAC}(\text{Unit\_j\_key:recipient\_k\_ID}) \quad (4b)$$

In equations 4a and 4b, the super key generator uses the super-master key and the unit name to generate the sub-master key Unit_j_key, which is then combined with the recipient identity for recipient k (recipient_k_ID) to produce a derived key $\text{Key}_{j,k}$ that is specific to both the intended recipient of the message (recipient k in this example) and the appropriate unit and key generator (unit j and key generator j in this example).

If desired, a hierarchical mechanism may be used to subdivide recipient identities. For example, there may be a number of sub-identities such as recipient_k_ID_1, recipient_k_ID_2, etc. associated with a recipient k whose ID is recipient_k_ID and who is a customer of an organization with a master key of master_key. The derived key for each sub-recipient of recipient_k_ID may be calculated using equations such as equations 5, 6a, and 6b.

$$\text{Key\_k} = \text{HMAC}(\text{master\_key: recipient\_k\_ID}) \quad (5)$$

$$\text{Key\_k\_1} = \text{HMAC}(\text{Key\_k: recipient\_k\_ID\_1}) \quad (6a)$$

$$\text{Key\_k\_2} = \text{HMAC}(\text{Key\_k:recipient\_k\_ID\_2}) \quad (6b)$$

Equation 5 may be used to calculate the derived key Key_k from the master key and the identity of recipient k. Equation 6a can be used to calculate a derived key for recipient sub-identity recipient_k_ID_1 based on the key for recipient k and the identity of recipient_k_ID_1. Equation 6b can be used to calculate a derived key for recipient sub-identity recipient_k_ID_2. Derived keys for other recipient sub-identities associated with recipient_k_ID may be calculated in the same way. The HMAC function is used to derive the keys of equations 5, 6a, and 6b. As described in connection with FIG. 2, other suitable key derivation functions may be used if desired.

The organization need only be aware of recipient identity recipient_k_ID. However, outside of the organization, the derived key for each sub-recipient can be calculated using the derived key for recipient_k_ID (i.e., Key_k). This allows Key_k to be used as a master key for a group of users managed by recipient k outside of the organization.

Recipient hierarchies may have any suitable numbers of layers. The example of equations 5, 6a and 6b, involves a two-layer scheme. Moreover, system 10 may have both a recipient hierarchy and a key generator hierarchy if desired.

Another aspect of the invention relates to authenticated derived keys. It may be desirable to be able to authenticate derived keys, particularly in environments without gateways. In systems without gateways, senders must obtain derived keys before they can encrypt an outgoing message. Problems can arise if a sender obtains an incorrect derived key due to an accidental or malicious transmission error or if an attacker masquerading as a key generator provides a sender with a fake key. Authenticated derived keys may be used to assure senders and recipients that they have properly obtained the keys that they have requested.

One suitable technique that may be used for key authentication is to use digital signatures. In this situation, the HMAC-based version of equation 1 becomes equation 1'.

$$\text{dkeyA} = \text{sign}(\text{private-key:recipient\_ID}) \quad (1')$$

In equation 1', the keyed-hash function of equation 1 has been replaced with a deterministic digital signature function "sign." In addition, the master key of equation 1 has been replaced with a private key (private-key). Equation 1' serves the same derived key generation function as equation 1 in system 10, but allows for entities to authenticate the derived keys they obtain.

A public key corresponding to the private key (called public-key) is made publicly accessible. The public key may, for example, be published by placing public-key on a suitable server inside or outside of the organization that is accessible to the public and/or to the organization 18 through a communications network 14. The public key may also be made accessible only to entities within the organization (e.g., by placing public-key on an internal server connected to an intranet 16).

In a system that uses this key authentication process, a derived key (dkeyA) may be verified using the verification operation of equation 7.

$$\text{valid}=\text{verify}(\text{public-key:recipient\_ID, dKeyA}) \quad (7)$$

In equation 7, the function "verify" is used to compute the parameter valid based on the public key and the values of recipient_ID and dKeyA. If dKeyA is not an authentic derived key, the parameter valid will be false and a sender or other entity will know not to use the derived key. If parameter valid is true, the derived key is authentic. Because of the unforgeability property of digital signature functions such as sign, it is infeasible to compute a derived key without knowledge of the private key. The function "sign" is deterministic (or suitably derandomized to behave deterministically), which ensures that the sender and recipient will both compute the same derived key when equation 1' is used.

With the systems described above, a sender in an organization can send an encrypted message to a recipient who is a customer of the organization. The recipient can contact the organization to obtain a copy of an appropriate derived symmetric key to use in decrypting the encrypted message. Recipients (acting as senders) can also use the derived symmetric keys to encrypt messages to the organization (e.g., a recipient can send an encrypted reply message back to a sender in the organization).

Sometimes a sender who is outside of an organization and who is not a customer of the organization would like to send an encrypted message to a recipient inside the organization or a recipient who is a customer of the organization. Because the sender is not affiliated with the organization, the sender does not have a preestablished relationship that allows the organization to authenticate the sender in the same way that a customer of the organization can be authenticated.

Figure 7:
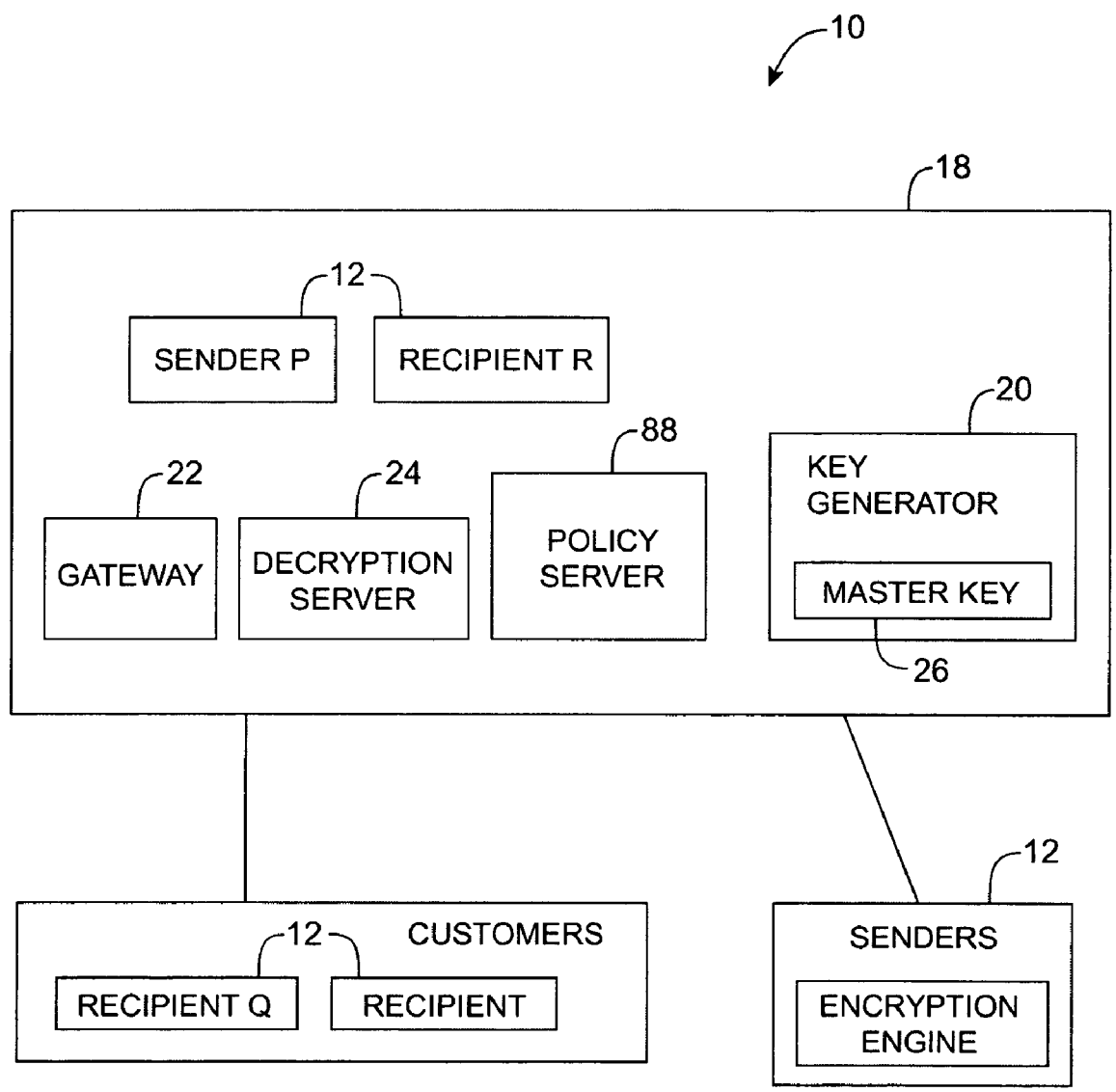
FIG. 7 is a diagram of an illustrative system that may be used to allow a sender who is not a customer of an organization to send a recipient at the organization a secure message in accordance with the present invention.

An illustrative system that may be used to enable non-customer senders to send secure messages to recipients at an organization or recipients who are customers of the organization is shown in FIG. 7.

In system 10 of FIG. 7, key generator 20 has a master key 26 that is used to produce derived keys. A sender P who desires to send an encrypted message to a recipient Q who is a customer of organization 18 may use a derived key from key generator 20 to encrypt the message. The message may be encrypted at the sender's equipment 12 or by a gateway 22. When recipient Q receives the encrypted message, recipient Q may request a copy of the derived key from the decryption server 24. Decryption server 24 may authenticate recipient Q and obtain a copy of the derived key from key generator 20. The decryption server 24 can then provide the derived key to recipient Q over a secure channel. Recipient Q can use the derived key to decrypt the encrypted message from sender P. Recipient Q can also use the derived key to encrypt a new message for sender P (e.g., a reply message that is responding to sender P's original message). Sender P has a copy of the derived key (or can obtain one), so sender P can decrypt recipient Q's encrypted reply.

Unlike recipient Q, sender S is not a customer of the organization 18. Because there is no preexisting relationship between sender S and the organization 18, organization 18 does not have credentials to use in authenticating sender S. Sender S therefore cannot authenticate to the decryption server 24 to obtain a copy of a derived key in the same way that recipient Q can authenticate to the decryption server 24. Because sender S is not part of organization 18, it is not desired to entrust sender S with the derived key of recipient Q.

In accordance with the present invention, organization 18 is provided with a policy server 88. Policy server 88 is shown as a separate server in the example of FIG. 7, but, if desired, policy server 88 can be implemented as part of gateway 22, as part of decryption server 24, as part of key generator 20, or as part of any other entity affiliated with organization 18. Policy server handles the generation of derived keys for non-customer senders such as sender S. A sender S can obtain such a non-customer message key when it is desired to send a secure message to a recipient who is a customer of the organization or who is at the organization 18.

The illustrative recipient R of FIG. 7 is located within organization 18, but recipient R could also be a recipient such as recipient Q who is a customer of the organization.

Figure 8:
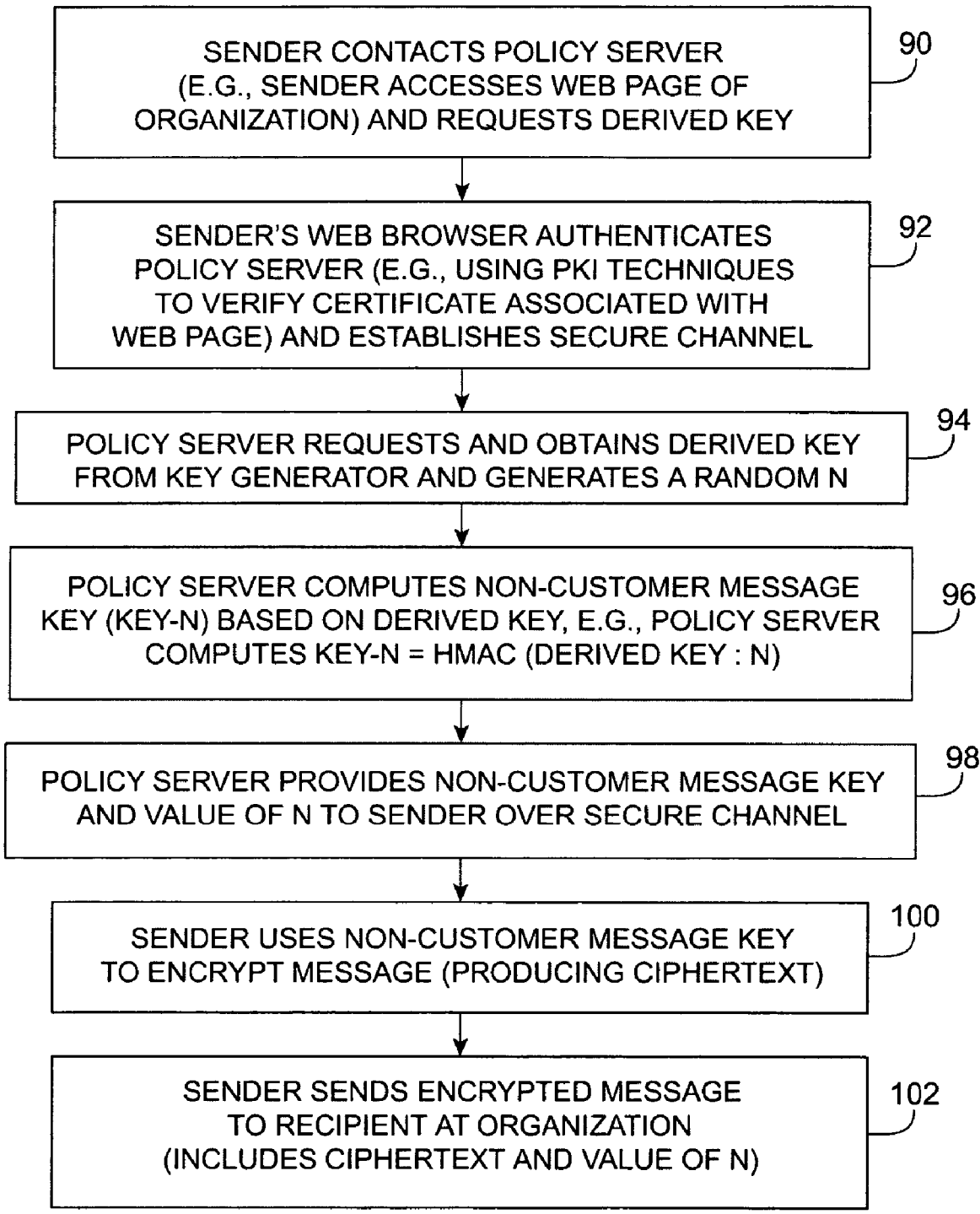
FIG. 8 is a flow chart of illustrative steps that may be used by a sender in a system of the type shown in FIG. 7 to encrypt and send a secure message to a recipient in accordance with the present invention.

Illustrative steps involved when a non-customer sender such as sender S encrypts and sends a secure message to a recipient such as recipient R are shown in FIG. 8.

At step 90, sender S contacts policy server 88 to request a key for sending a message to recipient R. Sender S may, for example, use a web browser running on sender S's equipment to access a web page that is associated with the policy server 88.

At step 92, the sender's web browser authenticates the policy server. Standard web browsers have built-in capabilities for using public-key infrastructure (PKI) techniques to perform this type of authentication (e.g., by verifying a certificate associated with the policy server's web page). During the process of authenticating the policy server, a secure communications channel (e.g., an SSL link) is established between the policy server 88 and sender S.

The key request from sender S includes information on the identity of the intended recipient (recipient_R_ID).

At step 94, the policy server 88 requests and obtains a derived symmetric key (Der_Key) for sender S from key generator 20. The policy server 88 also generates a random number N. The number N need not be truly random, but each such number is preferably only used once for each recipient. For instance, N could be based on a time stamp or a counter, although such approaches would respectively require the key generator to maintain a clock or a counter. The key request made by the policy server 88 includes information on the identity of the recipient (i.e., the value of recipient_R_ID that was provided by sender S). The key generator 20 can compute the derived key Der_Key using equation 8.

$$\text{Der\_Key}=\text{HMAC}(\text{master-key:recipient\_R\_ID}) \quad (8)$$

In equation 8, master-key is the master key of the key generator 20 and recipient_R_ID is a unique identifier for recipient R. The HMAC function of equation 8 (and the other key derivation equations herein) is merely illustrative. Any suitable hash function or other one-way function may be used to derive Der_Key, as described in connection with FIG. 2.

At step 96, the policy server 88 uses the derived key Der_Key and the random number N to compute the value of the non-customer message key Key-N. The policy server 88 may use any suitable key derivation function as described in connection with FIG. 2. For example, the policy server 88 may produce the non-customer message key Key-N using equation 9.

$$\text{Key-N}=\text{HMAC}(\text{Der\_Key:N}) \tag{9}$$

At step 98, the policy server 88 provides the non-customer symmetric message key Key-N to sender S over the secure channel.

At step 100, sender S uses the non-customer message key Key-N to encrypt a message for recipient R. Sender S may use an encryption engine on sender S's equipment to encrypt the message using Key-N to produce ciphertext.

At step 102, sender S sends the encrypted message to recipient R at organization 18. The sender may send both the ciphertext produced at step 100 and the value of N as part of the encrypted message or may provide the ciphertext and N in separate associated transmissions. The value of N that is transmitted from sender S to recipient R is unencrypted.

Figure 9:
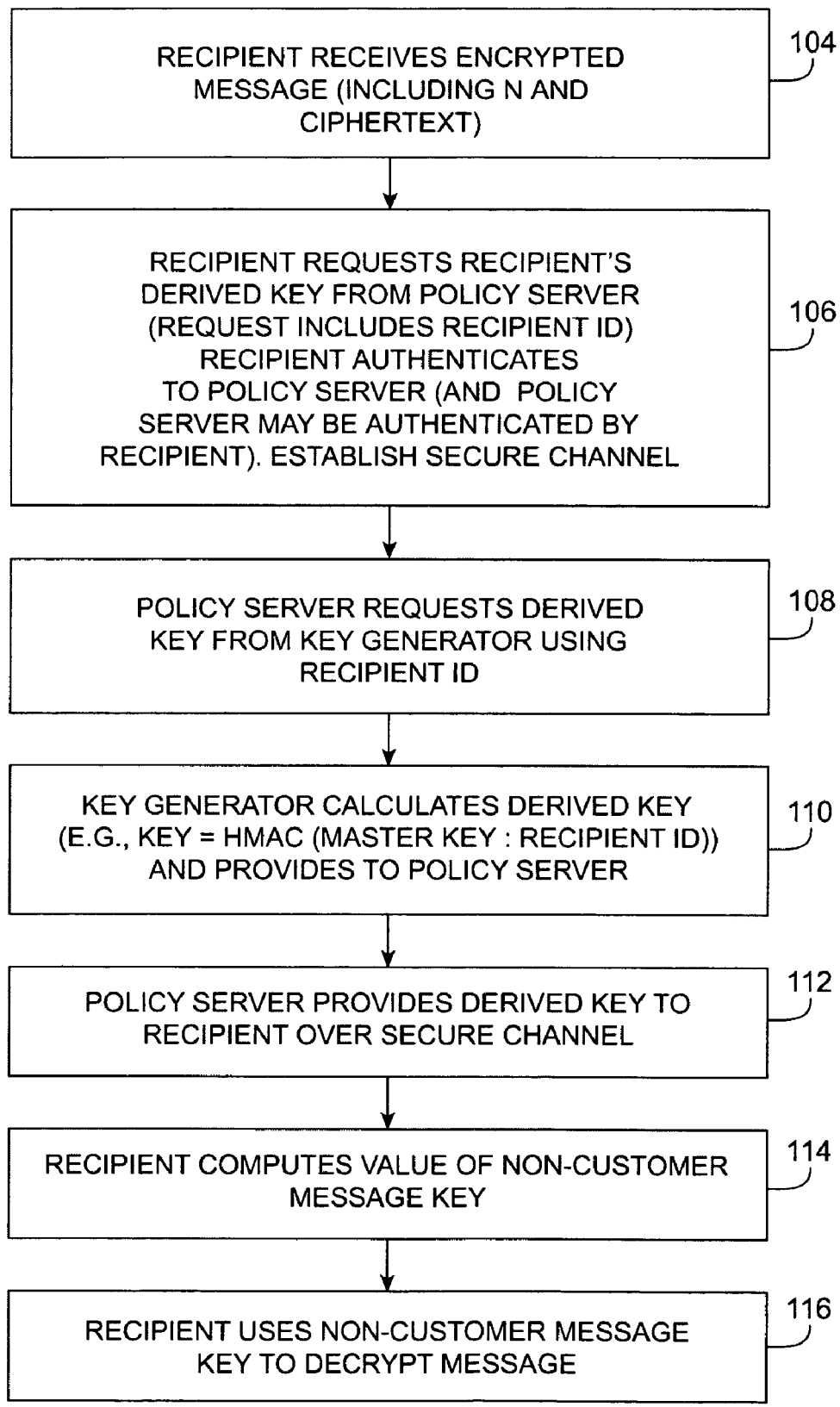
FIG. 9 is a flow chart of illustrative steps that may be used by a recipient in a system of the type shown in FIG. 7 to receive and decrypt a secure message from a sender in accordance with the present invention.

Illustrative steps involved in decrypting the message from sender S are shown in FIG. 9.

At step 104, recipient R receives the encrypted message including the unencrypted value of N and the ciphertext.

At step 106, recipient R requests a copy of the derived key Der_Key from the policy server or simply retrieves it from recipient's local cache if available. The key request includes the identity of recipient R (recipient_R_ID), so that the key generator will know which key to generate. During step 106, the recipient authenticates to the policy server. A secure communications channel (e.g., an SSL link) is established between recipient R and the policy server 88 during authentication.

If the policy server 88 and recipient are both within the organization, the process of authenticating the recipient may by implicit (e.g., policy server 88 may only need to confirm that the key request is from a user at the organization who is contacting the policy server over the organization's intranet). More extensive authentication techniques (e.g., involving the verification of recipient R's credentials by the policy server) may be used if desired. This type of authentication approach may be used, for example, when the recipient is a customer of organization 18 such as recipient Q rather than a user at organization 18.

If desired, the policy server may also be authenticated by the recipient (e.g., using PKI techniques) to ensure that the recipient is obtaining the requested key from a trusted source.

At step 108, the policy server uses the recipient ID information (recipient_R_ID) from the recipient's key request to request the derived key Der_Key from the key generator 20.

At step 110, the key generator 20 uses equation 8 (or other suitable function) to produce Der_Key for the policy server.

At step 112, the policy server 88 provides the derived key Der_Key to the recipient over the secure channel.

At step 114, the recipient uses the received value of N from the sender S and the derived key (Der_Key) from the policy server 88 to compute the value of the non-customer message key Key-N (e.g., using equation 9 or other appropriate one-way function). (The equation that is used when the policy server computes Key-N for the sender must match the equation that is used when the recipient computes Key-N.)

At step 116, the recipient uses the non-customer message key Key-N to decrypt the ciphertext and thereby access the contents of the message.

The foregoing is merely illustrative of the principles of this invention and various modifications can be made by those skilled in the art without departing from the scope and spirit of the invention.

What is claimed is:

1. A method for a sender at an organization to send a message to a recipient who is a customer of the organization over a communications network, wherein the recipient has a recipient identity (ID), comprising:

at the organization, deriving a symmetric key for encrypting the message from a master key using a one-way function whose inputs include the master key and the recipient ID;

at the organization, encrypting the message using the derived symmetric key and sending the message to the recipient over the communications network;

at the recipient, receiving the encrypted message;

at the recipient, submitting a derived symmetric key request to the organization over the communications network, wherein the derived symmetric key request includes the recipient ID;

authenticating the recipient to the organization and establishing a secure communications channel between the organization and the recipient over the communications network; and in response to the derived symmetric key request of the recipient, generating the derived symmetric key for the recipient to use in decrypting the message and providing the derived symmetric key to the recipient over the secure communications channel, wherein the organization has a gateway and a key generator and wherein encrypting the message comprises:

using the gateway at the organization to provide the key generator at the organization with a derived key request that contains the recipient ID; and in response to the derived key request from the gateway, using the key generator to compute the derived key using the one-way function.

2. The method defined in claim 1 wherein deriving the symmetric key comprises using a hash function to derive the symmetric key.

3. The method defined in claim 1 wherein deriving the symmetric key comprises using a digital signature function to derive the symmetric key.

4. The method defined in claim 1 wherein encrypting the message comprises using the derived symmetric key to encrypt the message at the gateway.

5. The method defined in claim 1 wherein the organization has a server wherein authenticating the recipient to the organization comprises using the server to authenticate the recipient.

6. The method defined in claim 1 wherein the organization has a decryption server, wherein authenticating the recipient and establishing a secure communications channel between the organization and the recipient over the communications network comprises using the decryption server to authenticate the recipient to the decryption server and establish a secure sockets layer (SSL) link between the decryption server and the recipient, and wherein providing the decryption key to the recipient comprises using the decryption server to provide the decryption key from the key generator to the recipient over the SSL link.

7. A method for a sender at an organization to send a message to a recipient, wherein the organization has a gateway, a key generator, a server, and an intranet to which the sender, gateway, key generator, and server are connected and wherein the recipient is outside of the organization, wherein the recipient is a customer of the organization, and wherein the recipient has a recipient identity (ID), the method comprising:

using the key generator to derive a symmetric key for encrypting the message from a master key using a hash message authentication code (HMAC) function whose inputs include the master key and the recipient ID;

providing the derived symmetric key from the key generator to the gateway over the intranet;

encrypting the message at the gateway using the derived symmetric key to produce an encrypted message;

providing the encrypted message from the gateway to the recipient outside of the organization over the Internet;

at the recipient, receiving the encrypted message;

authenticating the recipient to the server and establishing a secure sockets layer (SSL) link between the server and the recipient;

providing a derived symmetric key request to the server from the recipient, wherein the derived symmetric key request includes the recipient ID;

using the server to obtain the derived symmetric key from the key generator over the intranet using the recipient ID and to provide the derived symmetric key obtained from the key generator to the recipient over the SSL link; and at the recipient, using the derived symmetric key provided by the server over the SSL link to decrypt the encrypted message.

8. The method defined in claim 7 further comprising deriving the master key from a super master key using a one-way function.

* * * * *

UNITED STATES PATENT AND TRADEMARK OFFICE
CERTIFICATE OF CORRECTION

PATENT NO. : 7,624,269 B2 Page 1 of 1
APPLICATION NO. : 10/887721
DATED : November 24, 2009
INVENTOR(S) : Appenzeller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1439 days.

Signed and Sealed this

Fourteenth Day of December, 2010

David J. Kappos
*Director of the United States Patent and Trademark Office*